Feb. 4, 1936.  E. TIMBS ET AL  2,029,598
SWIVEL
Filed Oct. 22, 1934  4 Sheets-Sheet 1
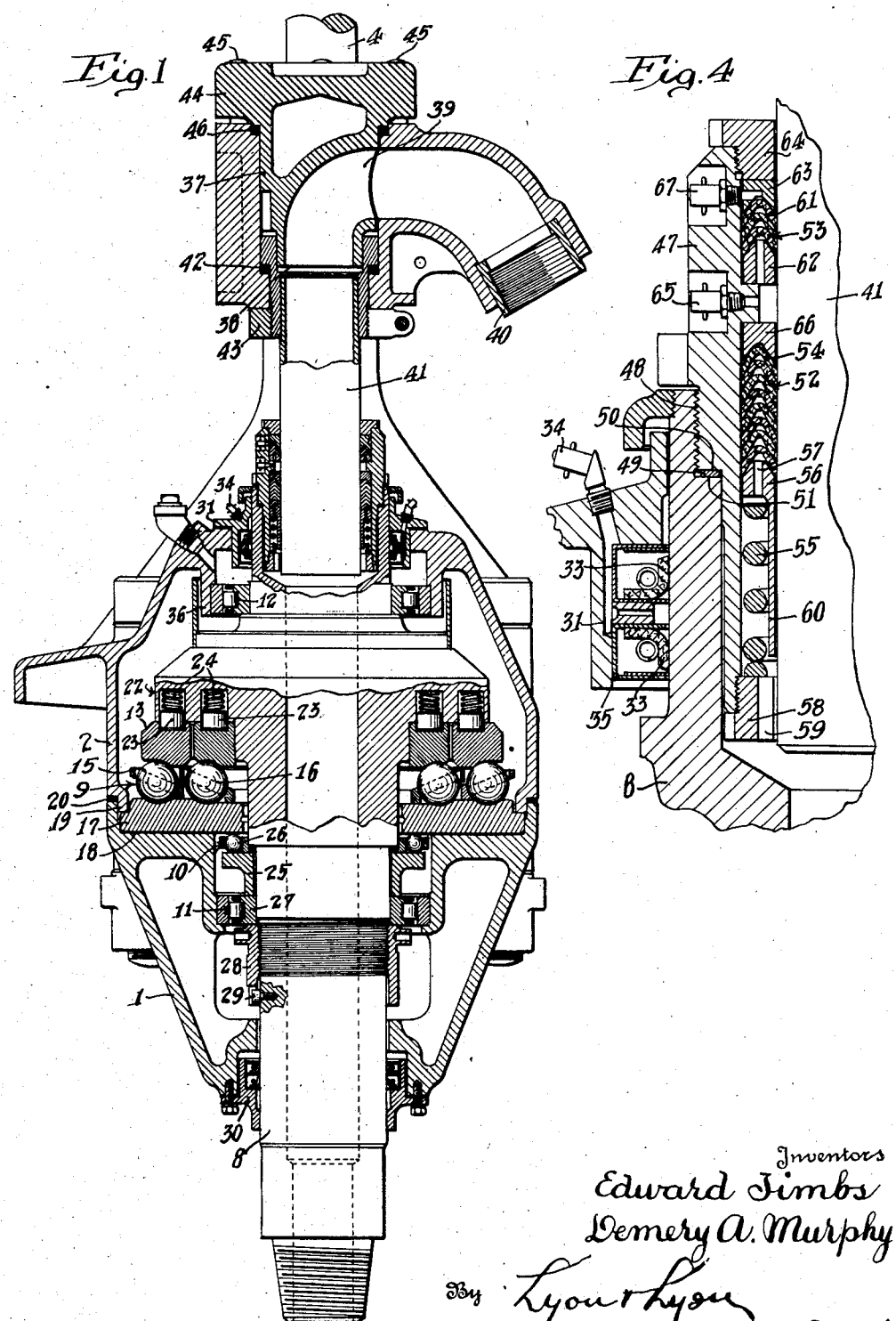

Feb. 4, 1936. E. TIMBS ET AL 2,029,598
SWIVEL
Filed Oct. 22, 1934 4 Sheets-Sheet 2

Inventors
Edward Timbs
Demery A. Murphy
By Lyon & Lyon
Attorneys

Feb. 4, 1936. E. TIMBS ET AL 2,029,598
SWIVEL
Filed Oct. 22, 1934 4 Sheets-Sheet 3

Inventors
Edward Timbs
Demery A. Murphy
By Lyon & Lyon
Attorneys

Patented Feb. 4, 1936

2,029,598

UNITED STATES PATENT OFFICE 2,029,598

SWIVEL

Edward Timbs, Los Angeles, and Demery A. Murphy, Torrance, Calif., assignors to The National Superior Company, Toledo, Ohio, a corporation of Delaware Application October 22, 1934, Serial No. 749,374

20 Claims. (Cl. 255—25)

This invention relates to a rotary swivel of the type employed in connection with the drilling of oil, gas, water, or other wells, by the rotary process or method.

It is an object of this invention to provide a rotary swivel for use in connection with oil, gas, water, or other wells, wherein the rotary method or process is employed, which rotary swivel is so formed as to provide for an improved structure wherein the entire bearing assembly for the swivel sleeve is enclosed and housed within the body of the swivel, and is also insertable into and removable from the swivel body as a unit with the swivel sleeve, and wherein the bearing assembly and sleeve are secured to the body and a cover member.

Another object of this invention is to provide an improved form of swivel for use in connection with oil, gas, water, or other wells, which swivel is so constructed as to provide for an improved packing between the swivel sleeve and wash pipe.

Other objects and advantages of this invention it is believed will be apparent from the following detailed description of a preferred embodiment thereof as illustrated in the accompanying drawings.

In the drawings:

Figure 1 is a side elevation mainly in vertical mid-section of a swivel embodying our invention.

Figure 4 is a fragmental sectional elevation illustrating the wash pipe packing and rotary swivel assembly embodying our invention.

Figures 2, 3:
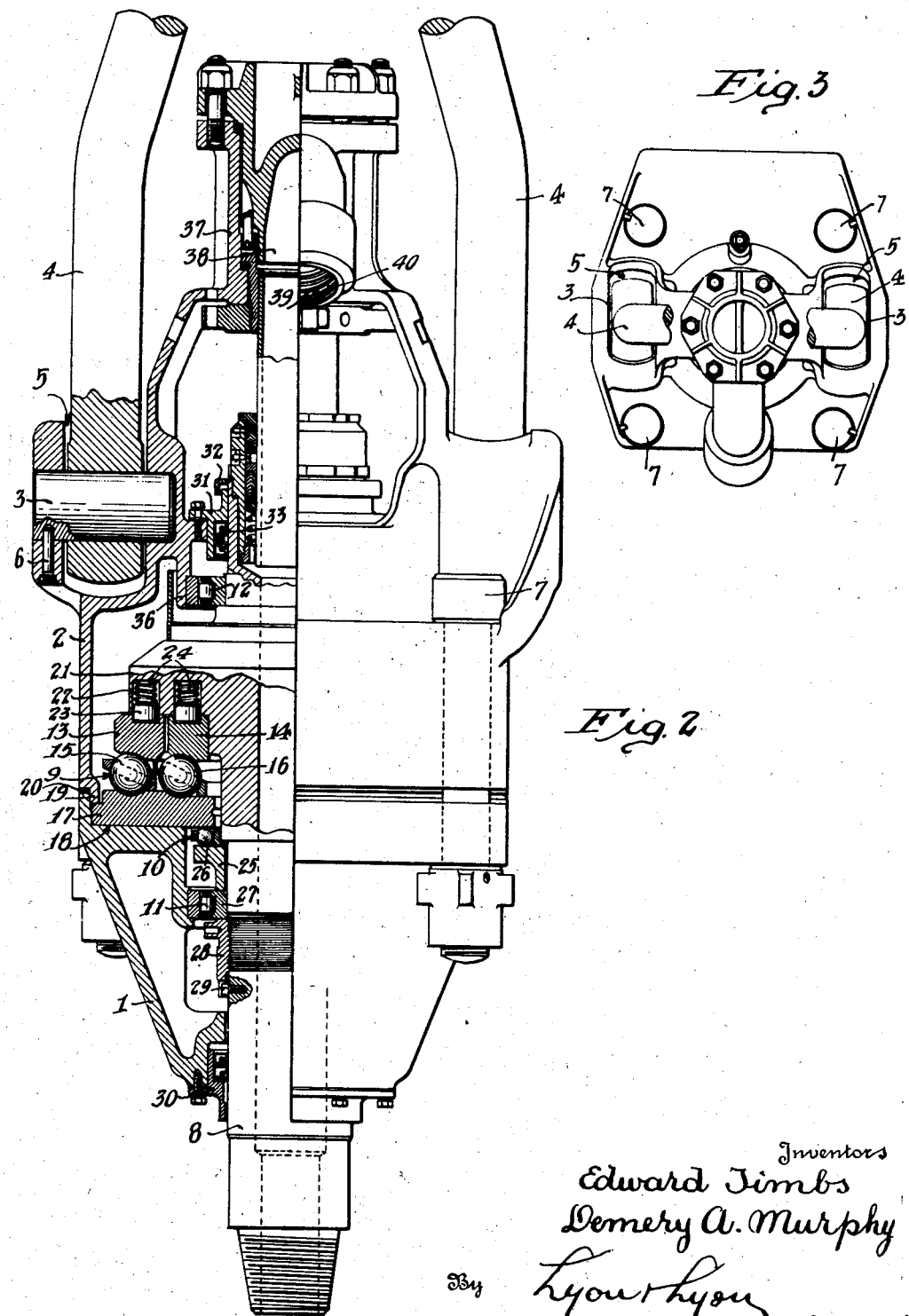
Figure 2 is a similar elevation mainly in vertical mid-section of the swivel as illustrated in Figure 1, which view is taken at right-angles to the sectional view as shown in Figure 1.
Figure 3 is a top plan view of the swivel as illustrated in Figures 1 and 2.

The swivel embodying our invention as illustrated in Figures 1 and 4 includes a body 1, and a cap member 2. The cap member 2 is fitted with trunnions 3 upon which the ends of the bails 4 are pivotally mounted within the bail-receiving pockets 5. The trunnions 3 are secured in position by means of pins 6. The cap 2 and body member 1 are secured together by means of a plurality of bolts 7.

Rotatably secured within the body 1 and cap 2 is a rotary sleeve 8 which may be connected at its lower end to a drill stem or "kelly" in the manner well known to those skilled in the art. Mounted upon the rotary sleeve 8 in a manner to be insertable into and removable from the swivel body as a unit with the rotary sleeve 8, is a bearing assembly including the main supporting bearing 9, upthrust bearing 10, and spaced radial bearings 11 and 12.

The main supporting bearing 9 is positioned between the body 1 and the sleeve 8 for the purpose of rotatably supporting the load which is carried by the rotary sleeve 8. The main bearing 9 includes a pair of upper race plates 13, 14 and two annular rows of balls 15 and 16, which are mounted upon a thrust carrying member or anchor plate 17. The anchor race plate 17 is mounted upon the shoulder 18 of the body 1 by means of a downwardly projecting flange 19 of the cap 2.

In order to secure an oil tight joint between the body 1 and cap member 2, a resilient packing 20 is positioned between the adjacent ends of the body 1 and cap 2 and is preferably formed of such thickness as to provide for a predetermined amount of compression before the flange 19 engages the upper face of the race plate 17.

The race plates 13 and 14 are interposed between the ball members 15 and 16 and the load supporting head 21 of the sleeve 8, and formed in the head 21 are a plurality of spring pockets 22 within which are fitted a plurality of dowel plugs 23 and springs 24 which always maintain a load on the upper race rings 13 and 14 in the event that the swivel sleeve is moved upwardly relatively to the body until the upthrust load is imposed upon the upthrust bearing 10. The dowels 23 secure the race rings 13 and 14 against relative rotation with respect to the swivel sleeve 8.

The race plate 17 provides the thrust member for taking the upthrust transmitted through the upthrust bearing 10 from the drill stem when the swivel cap and body are allowed to rest on the rotary sleeve.

The race plate 25 of the upthrust bearing 10 is carried by the sleeve 8 and interposed between the plates 17 and 25 is an annular row of balls 26. Positioned below the race plate 25 is the inner race ring 27 of the lower radial bearing 11.

In order to provide for the adjustment of the bearing clearance between the main supporting bearing 9 and the upthrust bearing 10, and so that this adjustment may be effected when the sleeve 8 is removed from the body 1, and so that when the sleeve 8 is positioned within the body 1 and the cap 2 is assembled thereon, the said bearings will be properly adjusted, a collar 28 is threadedly secured upon the sleeve 8 in position to engage the lower end of the inner race ring 27 of the radial bearing 11 and to thereby adjust the bearing clearance between the main and upthrust bearings. In order to secure the collar 28 in adjusted position, a lock screw 29 which fits within a recess formed within the end of the collar 28 is provided.

In order to maintain lubricant within the body 1 of the swivel, an oil seal 30 is provided at the lower end of the body between the end of the body 1 and the sleeve 8. A similar oil seal 31 is provided between the upper end of the cap 2 and the sleeve 8. An umbrella 32 is secured to the upper end of the sleeve 8 and overlaps the oil seal 31 to exclude the entrance of foreign matter into the oil seal.

In order to prevent the seal rings 33 of the upper oil seal 31 from becoming dry, there is provided a lubricant conveying connection 34 which communicates with the space between the two opposed seal rings 33. Lubricant may be supplied under pressure through said connection and is forced past the seal rings 33 and dislodges any foreign matter that may come in contact with the upper ring. Lubricant from the pressure connection 34 forms a lubricant seal between the sleeve 8 and the container 35 of the upper lubricant seal 31. The upper radial bearing 12 is positioned at the upper end of the sleeve 8 and is aligned within the downwardly extending flange 36 of the cap member 2.

Carried by the cap member 2 is a wash pipe and circulating hose support 37 which is provided with a vertical opening 38 and a lateral opening 39. The lateral opening 39 is provided with an inserted thread connection 40 for connection with a circulating hose (not shown). A wash pipe 41 is insertable through the vertical opening 38 and is secured in pressure-tight relation to the support 37 by means of a packing 42 which is compressed through the medium of a threaded collar 43. The upper end of the opening 38 is closed by means of a removable cap 44 secured in place by means of bolts 45. A packing 46 provides a pressure-tight joint between the support 37 and the cap 44.

The wash pipe 41 projects downwardly into the rotary sleeve 8 and in the opening defined between the sleeve 8 and the wash pipe 41 we provide an improved means for packing the connection between the rotating sleeve 8 and the stationary wash pipe 41, which packing assembly is insertable into and removable as a unit from the interior of the sleeve 8 and is illustrated in detail, particularly in Figure 4.

This packing assembly includes a removable packing container 47 which is threaded into the upper end of the sleeve 8, as indicated at 48, and is maintained in pressure-tight relation thereto by means of packing 49 which is interposed between mating shoulders 50 and 51 of the container 47 and sleeve 8 respectively.

Positioned within the container 47 is spaced packing 52 and 53, respectively. The packing 52 as herein illustrated preferably includes a plurality of V-shaped annular packing rings 54 which are always maintained under initial compression by means of a spring 55. Positioned between the spring 55 and the lowermost packing ring 54 is a follower 56 which has a series of openings 57 to admit fluid pressure to the packing ring 54 and at the same time urge the edges of the packing rings 54 into contact with the outer surface of the wash pipe 41 and the inner surface of the container 47. A nut 58 is threaded into the lower end of the container 47 to secure the packing ring 54, follower 56, and spring 55, in position. The nut 58 is provided with grooves 59 which admit the fluid into the annular recesses around the wash pipe. A downwardly projecting skirt or sleeve 60 is formed integrally with the follower 56 for the purpose of limiting the downward movement of the follower. The packing 53 includes a set of packing rings 61 which are positioned between rings 62 and 63 and are retained in place by means of a nut 64.

In order to insure the lubrication of the surface between the packing rings 54 and the wash pipe 41, we provide a lubricant connection 65 between the header ring 62 and the header ring 66 of the packing assembly.

Lubricant supplied under pressure through this connection insures that lubricant will pass downwardly over the surface of the wash pipe 41 in contact with the packing rings 54 and thereby lubricate the surface and also expel any foreign matter which would tend to abrade the surface of the wash pipe 41 that is in contact with the packing rings 54.

A second lubricant conveying connection 67 is provided to supply the upper rings 61 with lubricant. The pressure applied to the packing rings 54 by means of the spring 55 is supplemented by the fluid pressure of the circulating fluid when the circulating fluid is passing through the swivel. With the construction as thus provided, the pressure of the packing against the wash pipe 41 is maintained as a function of the fluid pressure which is to be sealed off by the packing. Furthermore, there is no requirement for any manual adjustment of the packing.

Figure 5:
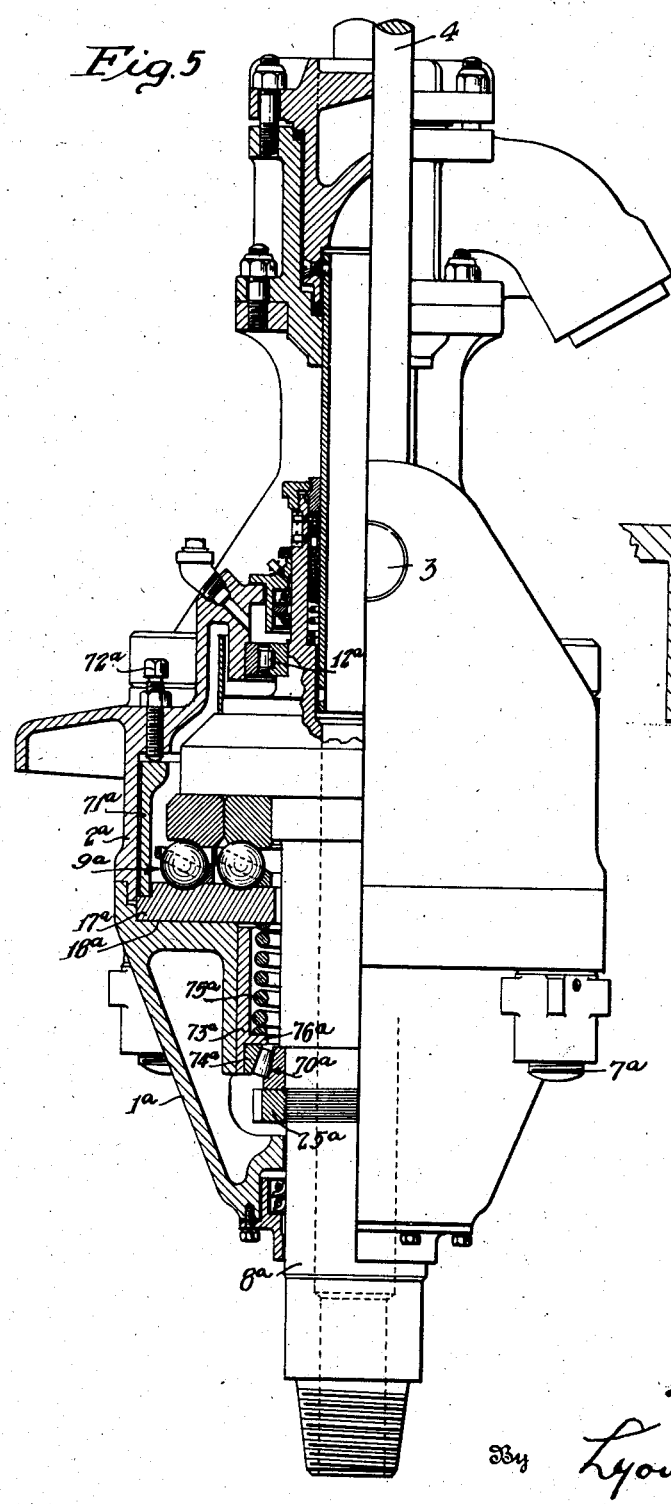
Figure 5 is a sectional side elevation partly in vertical mid-section of a modified form of swivel embodying our invention.
Figure 6:
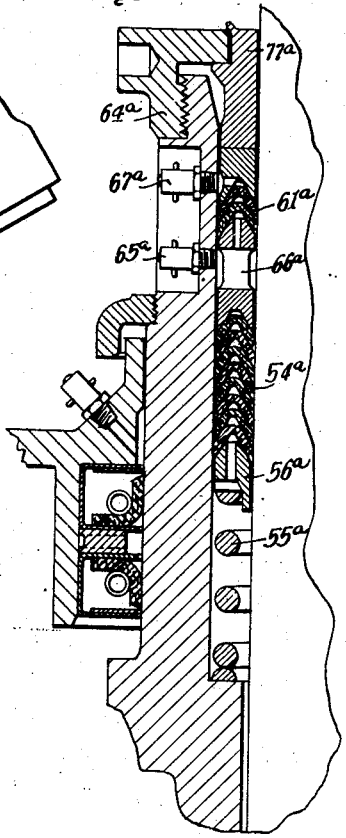
Figure 6 is a fragmental sectional view on an enlarged scale illustrating the form of wash pipe packing assembly as incorporated in the modified form of swivel illustrated in Figure 5.

As illustrated in Figures 5 and 6, the modified form of our invention is shown in which illustration similar parts have been numbered with the same numbers with the addition of an exponent "a" thereto.

In this construction the body 1a and cap 2a are bolted together by means of longitudinal bolts 7a and form an enclosure for the rotary sleeve 8a and the main bearing 9a, the combined upthrust and radial bearings 10a and the upper radial bearing 12a. The thrust carrying plate 17a is secured upon the shoulder 18a of the body 1a by means of a ring 71a which is contained within the cover member 2a and the ring member 71a is adjustably maintained in contact with the member 17a by means of a plurality of bolts 72a threadedly mounted in the cap member 2a. With this construction it is possible to clamp the cap 2a and the body member 1a together into face-to-face engagement wherein a thin sheet gasket may be employed for an oil seal. With the cap and body members tightly clamped together, the screw 72a can then be adjusted to insure that the thrust plate 17a is rigidly seated upon the shoulder 18a. In this modified construction we also employ a combined radial and upthrust bearing 70a which is carried by the sleeve 8a on the threaded collar 25a. A sleeve 73a is slidably mounted within the bore of the body 1a and carries the stationary race 74a of the combined radial and upthrust bearing 70a. A compression spring 75a, designed to support a load equal to the weight of the non-rotating elements of the swivel assembly, is interposed between thrust supporting plate 17a and a flange 16a of the sleeve 13a.

As illustrated in Figure 6, the packing assembly is of the type that can be inserted directly into the opening of the sleeve 8a and consists of a multiplicity of rings 54a which are maintained under an initial compression through the medium of the follower 56a and spring 55a. Interposed between the upper seal rings 61a and the lower seal rings 54a is a follower 66a which is provided with openings for conveying lubricant from the connection 65a to the packing rings 54a. Lubricant is supplied through the upper connection 67a to the upper rings 61a. The entire packing assembly consisting of the packing rings 54a and 61a and the followers 56a and 66a and the spring 55a, are secured within the swivel sleeve recess by means of the nut 64a which engages the upper shoulder of the header ring 77a. In this construction both sets of packing rings 54a and 61a are maintained at all times under a predetermined initial load and the pressure of the fluid passing through the connection supplements the spring pressure.

Figure 7:
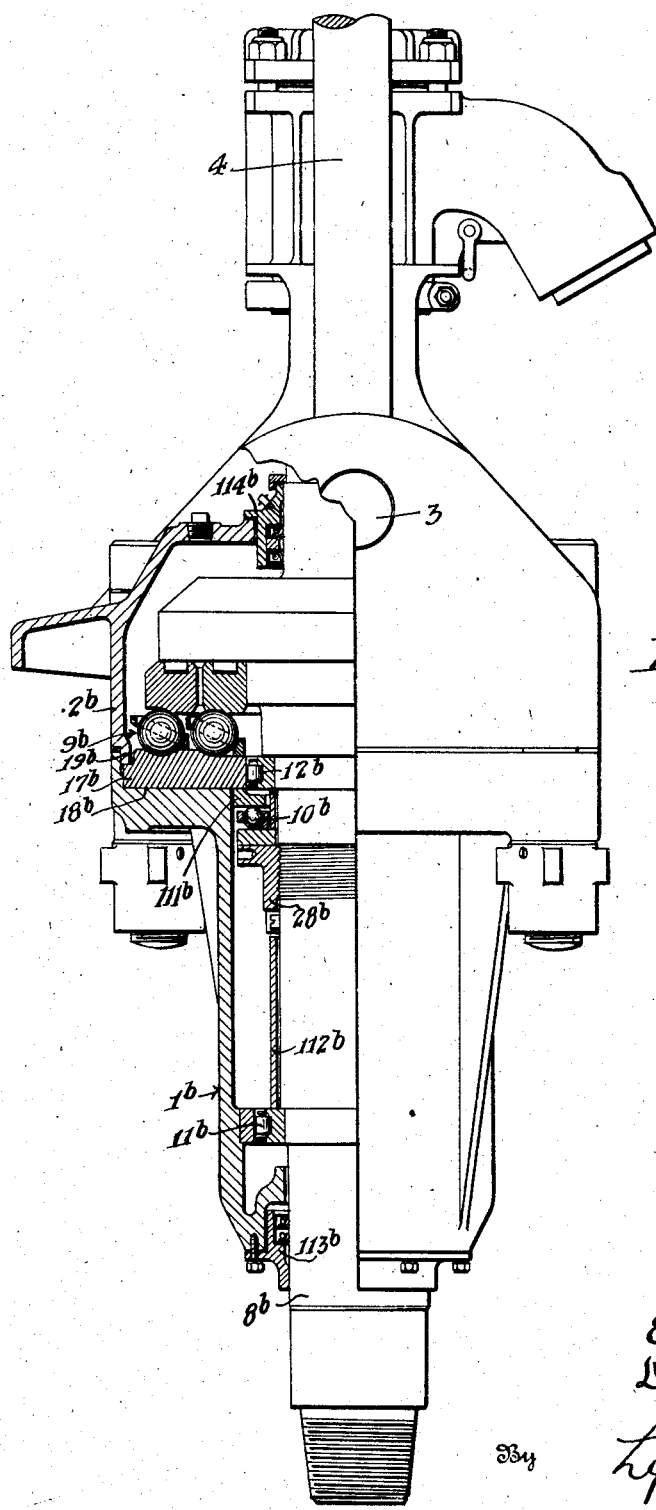
Figure 7 is an elevation partly in vertical mid-section of a further modified form of swivel embodying our invention.

In the modified form of our invention illustrated in Figure 7, similar parts have been indicated by similar numerals with the addition of an exponent "b" thereto.

This modification differs from that heretofore disclosed primarily in that the radial bearings 9b, 11b and 12b are relocated so that both of the radial bearings 11b and 12b are located below the main supporting bearings 9b, thereby permitting of the easy lubrication of these bearings without the necessity of maintaining a high head of lubricant above the main supporting bearings as is essential in cases of the modifications as heretofore disclosed, and in the fact that the lower race plate 17b is formed to provide the outer race for the upper of the radial bearings 12b. The lower race plate 17b is supported on the shoulder 18b of the body 1b. A cap 2b has the depending flange 19b which securely anchors the race plate 17b on the shoulder 18b against any axial movement. The upthrust bearing 10b is carried by the sleeve 8b and is adjustably secured thereto by means of the collar 28b. The upthrust of the sleeve 8b is transmitted to the bearing 10b and the reaction of this upthrust is taken by the race plate 17b against which the stationary upthrust plate 111b abuts.

The upper radial bearing 12b is positioned within the bore of the race plate 17b so that there is provided an accurate alignment of the sleeve 8b relative to the race plate 17b.

The lower radial bearing 11b is pressed onto the sleeve 8b or may be secured thereto by any suitable means such as by a threaded annular collar similar to the annular collar 28b. The outer race of the lower radial bearing 11b is pressed into the bore of the body 1b.

A spacing sleeve 112b may be positioned between the collar 28b and the inner race of the bearing 11b so as to facilitate the removal of the race upon the collar 28b being unthreaded from the sleeve 8b. At the lower end of the body 1b and at the upper end of the cap 2b there are provided oil retainers 113b and 114b respectively for the purpose of maintaining an enclosed chamber within which the bearings are mounted.

Having fully described our invention, it is to be understood that we do not wish to be limited to the details herein set forth, but our invention is of the full scope of the appended claims.

We claim:

1. In a rotary swivel, the combination of a body having a supporting shoulder, a sleeve rotatably positioned axially of and projecting through the body, means cooperating with the sleeve and the body to form a bearing enclosure at one end, a thrust carrying member supported on said shoulder, a cover, releasable means to secure the cover to said body, means on said cover to secure the thrust carrying member on said shoulder, a main supporting bearing between the sleeve and the thrust carrying member, and an upthrust bearing between the sleeve and the thrust carrying member, said sleeve, thrust carrying member and bearings being insertable and removable as a unit relative to said body upon the cover being detached from the body.

2. In a rotary swivel, the combination of a body having a supporting shoulder, a sleeve rotatably positioned axially of and projecting through the body, means cooperating with the sleeve and the body to form a bearing enclosure at one end, a thrust carrying member supported on said shoulder, a cover, releasable means to secure the cover to said body, adjustable means on said cover to secure the thrust carrying member on said shoulder, a main supporting bearing between the sleeve and the thrust carrying member, and an upthrust bearing between the sleeve and the thrust carrying member, said sleeve, thrust carrying member and bearings being insertable and removable as a unit relative to said body upon the cover being detached from the body.

3. In a rotary swivel, the combination of a body having a supporting shoulder, a cover secured to said body, a sleeve rotatably positioned axially of and projecting through the body, means cooperating with the sleeve and the body to form a bearing enclosure at one end, a thrust carrying member supported on said shoulder, means accessible with the cover in place to secure said member on said shoulder, a main supporting bearing between the sleeve and the thrust carrying member, and an upthrust bearing between the sleeve and the thrust carrying member, said sleeve, thrust carrying member and bearings being insertable and removable as a unit relative to said body in the absence of the cover.

4. In a rotary swivel, the combination of a body having a supporting shoulder, a cover secured to said body, a sleeve rotatably positioned axially of and projecting through the body, means cooperating with the sleeve and the body to form a bearing enclosure at one end, spaced radial bearing means for the sleeeve, a thrust carrying member supported on said shoulder, means to secure said member on said shoulder, a main supporting bearing between the sleeve and the thrust carrying member, and an upthrust bearing between the sleeve and the thrust carrying member, said main supporting and upthrust bearings being positioned longitudinally of the sleeve between said radial bearing means.

5. In a rotary swivel, the combination of a body having a supporting shoulder, a cover secured to said body, a sleeve rotatably positioned axially of and projecting through the body, means cooperating with the sleeve and the body to form a bearing enclosure at one end, a radial bearing for the sleeve in the cover, a radial bearing for the sleeve in the body, a thrust carrying member supported on said shoulder, means to secure said member on said shoulder, a main supporting bearing between the sleeve and the thrust carrying member, and an upthrust bearing between the sleeve and the thrust carrying member, said main supporting and upthrust bearings being positioned longitudinally of the sleeve between said radial bearings.

6. In a rotary swivel, the combination of a body having a supporting shoulder, a cover adapted to be secured to said body, a sleeve rotatably positioned axially of and projecting through the body, means cooperating with the sleeve and the body to form a bearing enclosure at one end, a thrust carrying member supported on said shoulder, resilient packing means between the body and cover, a face on said cover being adapted to seat on said packing, a face on said cover being adapted to seat on said thrust carrying member to secure said member on the body, said faces seating on the packing means and on the thrust carrying member in sequence and in the order given when the cover is assembled on the body, and down-thrust and upthrust bearing means between said sleeve and thrust carrying member.

7. In a rotary swivel, the combination of a body having a supporting shoulder, a sleeve rotatably positioned axially of and projecting through the body, means cooperating with the sleeve and the body to form a bearing enclosure at one end, a thrust carrying member supported on said shoulder, a cover, releasable means to secure the cover to said body, means to secure the thrust carrying member on said shoulder, a main supporting bearing between the sleeve and the thrust carrying member, a combined radial and upthrust bearing carried by said sleeve, means to align a stationary element of said last named bearing axially relative to the body, yieldable pressure means between the stationary element of said last named bearing and the thrust carrying member, said sleeve, thrust carrying member and bearings being insertable and removable as a unit relative to said body upon the cover being detached from the body.

8. In a rotary swivel, the combination of a housing, a rotary sleeve supported by said housing, a fluid conducting passage through said sleeve, a relatively stationary washpipe carried by said housing and extending axially of said sleeve, a packing container secured to said rotary sleeve, a pair of longitudinally spaced packing means positioned in said container to seal against said wash pipe, means to space said packing means longitudinally of the sleeve, the lower of said packing means including a plurality of inverted V-shaped packing rings, a follower ring seated against the lowermost packing ring, spring means within said container to yieldably urge said follower against said rings, and means to introduce lubricant downwardly under pressure between the wash pipe and the lower packing means.

9. In a rotary swivel, the combination of a housing, a rotary sleeve supported by said housing, a fluid conducting passage through said sleeve, a relatively stationary wash pipe carried by said housing and extending axially of said sleeve, a packing recess formed within said sleeve adjacent one end of said wash pipe, a plurality of inverted V-shaped packing rings in said recess encircling said wash pipe, a follower ring seated against the lower-most packing ring, spring means within said sleeve to yieldably urge said follower against said rings, and means to introduce lubricant downwardly under pressure between the wash pipe and the packing rings.

10. In a rotary swivel, the combination of a body, a sleeve rotatably mounted in the body, a relatively stationary wash pipe concentrically mounted for a portion of its length with reference to the rotary sleeve, means carried by the body for supporting the wash pipe, means for packing the wash pipe relative to the sleeve, including a packing recess formed between the wash pipe and the sleeve, a plurality of packing rings in said recess, a follower mounted in said recess, means whereby an initial pressure is exerted against said follower independently of the fluid pressure sealed off to maintain the packing rings in expanded condition between the sleeve and wash pipe, and means for introducing lubricant under pressure between the wash pipe and the packing rings.

11. In a swivel, the combination of a body, a sleeve rotatably mounted in the body, a relatively stationary wash pipe concentrically mounted for a portion of its length with reference to the rotary sleeve, means carried by the body for supporting the wash pipe, means for packing the wash pipe relative to the body, including a packing recess formed between the wash pipe and the sleeve, a plurality of packing rings adapted to expand under fluid pressure exerted from one direction axially of the body, a follower mounted in said recess, means whereby an initial pressure is exerted against said follower in the direction to expand said packing rings independently of the fluid pressure sealed off, and means for introducing lubricant under pressure between the packing rings and said wash pipe in a direction counter to the direction of the pressure acting to expand said rings.

12. In a rotary swivel for drilling wells; the combination of a bearing housing including detachably connected upper and lower members; one of said members having a supporting shoulder; a rotary sleeve assembly positioned in part within said bearing housing; means cooperating with said housing and sleeve assembly to provide a lubricant chamber; said assembly including a rotary sleeve, a stationary thrust bearing race plate supported on said shoulder, a main supporting bearing between the race plate and a shoulder provided on said sleeve, an upthrust bearing between the race plate and a second shoulder provided on said sleeve, means carried on the sleeve to adjust one of said shoulders axially relative to the other to limit the end play of the sleeve relative to the main supporting and upthrust bearings, a radial bearing between the sleeve and the bore of the race plate; a second radial bearing positioned within the lower housing member and spaced axially below the first mentioned radial bearing; and means to secure the race plate on the supporting shoulder against axial movement.

13. In a rotary swivel for drilling wells; the combination of a bearing housing including detachably connected upper and lower members; one of said members having a supporting shoulder; a rotary sleeve assembly positioned in part within said bearing housing; means cooperating with said housing and sleeve assembly to provide a lubricant chamber; said assembly including a rotary sleeve, a stationary thrust bearing race plate supported on said shoulder, a main supporting bearing between the race plate and a shoulder provided on said sleeve, an upthrust bearing between the race plate and a second shoulder provided on said sleeve, means carried on the sleeve to adjust one of said shoulders axially relative to the other to limit the end play of the sleeve relative to the main supporting and upthrust bearings; spaced radial bearings positioned below the main bearing to rotatably support the sleeve axially of the housing; and means to secure the race plate on the supporting shoulder against axial movement.

14. In a rotary swivel for drilling wells, the combination of a bearing housing including detachably connected upper and lower members, one of said members having a supporting shoulder; a stationary thrust bearing element positioned on said shoulder, a sleeve having a load carrying shoulder and positioned in part within said housing, a thrust bearing element non-rotatively mounted relative to said sleeve, bearing means positioned between said elements to rotatively support said sleeve against down thrust loads, upthrust bearing means to permit the relative rotation of the sleeve when the load is reversed from down thrust to upthrust, and yieldable means acting between the sleeve and the second thrust bearing element to prevent the relative axial separation of the trust bearing elements and bearing means when the down thrust load is relieved or reversed.

15. In a rotary swivel, the combination of a pair of relatively rotatable fluid conducting members, the first member encircling a portion of the second member and cooperating therewith to define a packing recess, inner and outer longitudinally spaced packing means positioned in said recess and contacting the second member to provide a fluid tight rotary joint between said members, means for introducing lubricant between said spaced packing means, said packing means being arranged to prevent the escape of the lubricant past the outer packing means while permitting the lubricant to be injected between the contacting surfaces of the second member and the encircling inner packing means.

16. In a rotary swivel, the combination of a pair of relatively rotatable fluid conducting members, the first member encircling a portion of the second member and cooperating therewith to define a packing recess, inner and outer longitudinally spaced packing means positioned in said recess and contacting the second member to provide a fluid tight rotary joint between said members, means for introducing lubricant between said packing means, the outer packing means including a pressure sealed type of packing ring arranged to prevent the escape of lubricant outwardly and permit the lubricant to be injected between the contacting surfaces of the second member and the encircling inner packing means.

17. In a rotary swivel, the combination of a pair of relatively rotatable fluid conducting members, the first member encircling a portion of the second member and cooperating therewith to define a packing recess, inner and outer longitudinally spaced packing means positioned in said recess and contacting the second member to provide a fluid tight rotary joint between said members, said group of packing means including a pressure sealed type of packing ring, means for introducing lubricant between said packing means, said packing rings being arranged to prevent the escape of lubricant outwardly past the outer packing means and permit the lubricant to be injected between the contacting surfaces of the second member and the encircling inner packing means.

18. In a rotary swivel, the combination of a pair of relatively rotatable fluid conducting members, a packing container detachably mounted on the first member and encircling a portion of the second member to define a packing recess, means to provide a fluid tight connection between said container and first member, inner and outer longitudinally spaced packing means positioned in said container and contacting the second member to provide a fluid tight rotary joint between said members, means for introducing lubricant between said packing means, the outer packing means including a pressure sealed type of packing ring arranged to prevent the escape of lubricant outwardly and permit the lubricant to be injected between the contacting surfaces of the second member and the encircling inner packing means.

19. In a rotary swivel for drilling wells, the combination of a bearing housing including detachably connected upper and lower members, one of said members having a supporting shoulder, a stationary thrust bearing element positioned on said shoulder, a sleeve having a load carrying shoulder and positioned in part within said housing, a thrust bearing element adapted to rotate with said sleeve and engage said load carrying shoulder upon a down thrust load being applied to said sleeve, bearing means positioned between said elements to rotatively support said sleeve against down thrust loads, upthrust bearing means to permit the relative rotation of the sleeve when the load is reversed from down thrust to upthrust, dowel means between the second thrust bearing element and the sleeve, and yieldable means operatively associated with the sleeve and dowel means and acting to prevent the relative axial separation of the thrust bearing elements and bearing means when the down thrust load is relieved or reversed.

20. In a rotary apparatus used for drilling wells, the combination of a stationary member, a rotary member positioned axially of an opening in the stationary member and being provided with a downthrust load supporting shoulder, means carried by said rotary member to provide an upthrust load supporting shoulder, downthrust bearing means including a bearing ring adapted to rotate with said rotary member interposed between the downthrust load supporting shoulder and said stationary member, upthrust bearing means including a bearing ring adapted to rotate with said rotary member interposed between the upthrust load supporting shoulder and said stationary member, and yieldable means acting between said rotary member and one of said bearing rings to apply an initial load thereto and prevent the relative axial separation of the elements of the respective thrust bearing means upon the applied thrust load being relieved from said bearing means or reversed in direction.

EDWARD TIMBS.
DEMERY A. MURPHY.

CERTIFICATE OF CORRECTION.

Patent No. 2,029,598.                                              February 4. 1936.

EDWARD TIMBS, ET AL.

It is hereby certified that error appears in the printed specification of the above numbered patent requiring correction as follows: Page 4, second column, line 22, claim 11, for "body" read sleeve; page 5, first column, line 23, claim 14, for "trust" read thrust; and that the said Letters Patent should be read with these corrections therein that the same may conform to the record of the case in the Patent Office.

Signed and sealed this 31st day of March, A. D. 1936.

(Seal)
Leslie Frazer
Acting Commissioner of Patents.